(12) United States Patent
Walworth

(10) Patent No.: US 8,202,485 B2
(45) Date of Patent: Jun. 19, 2012

(54) PARTICULATE FLOW CONTROL PROCESS

(75) Inventor: Brent Walworth, Sint-Niklaas (BE)

(73) Assignee: Ineos Manufacturing Belgium NV, Scheldelaan (BE)

( * ) Notice: Subject to any disclaimer, the term of this patent is extended or adjusted under 35 U.S.C. 154(b) by 214 days.

(21) Appl. No.: 12/654,496

(22) Filed: Dec. 22, 2009

(65) Prior Publication Data

US 2010/0126590 A1 May 27, 2010

Related U.S. Application Data

(63) Continuation of application No. 10/538,844, filed as application No. PCT/EP03/14039 on Dec. 5, 2003, now Pat. No. 7,713,490.

(30) Foreign Application Priority Data

Dec. 13, 2002 (GB) .................................. 0229133.4

(51) Int. Cl.
*G05D 11/08* (2006.01)

(52) U.S. Cl. .......... 422/219; 526/66; 422/131; 422/132; 422/133; 422/134; 422/135; 422/136; 422/137; 422/138; 422/232; 422/233; 502/6; 700/265; 700/266; 700/268; 700/269

(58) Field of Classification Search .......... 422/131–138, 422/219, 232–233; 700/265, 266, 268, 269; 502/6; 526/66

See application file for complete search history.

(56) References Cited

U.S. PATENT DOCUMENTS

| | | | |
|---|---|---|---|
| 3,008,809 A | 11/1961 | Martinez et al. | |
| 3,880,598 A * | 4/1975 | Van Der Toorn et al. | 422/216 |
| 4,529,568 A * | 7/1985 | Benedini et al. | 264/262 |
| 5,098,667 A * | 3/1992 | Young et al. | 422/111 |
| 5,403,556 A | 4/1995 | Sosa et al. | |
| 5,648,051 A * | 7/1997 | Trimble et al. | 422/207 |
| 6,197,264 B1 * | 3/2001 | Korhonen et al. | 422/136 |
| 6,982,236 B2 * | 1/2006 | Wenzel et al. | 502/117 |
| 2002/0187081 A1 * | 12/2002 | Hottovy et al. | 422/132 |
| 2003/0027945 A1 * | 2/2003 | Kufeld et al. | 526/64 |
| 2003/0083444 A1 * | 5/2003 | McElvain et al. | 526/64 |
| 2004/0122187 A1 * | 6/2004 | Verser et al. | 526/64 |
| 2004/0122188 A1 * | 6/2004 | Burns et al. | 526/90 |

FOREIGN PATENT DOCUMENTS

| | | |
|---|---|---|
| GB | 896 786 A | 5/1962 |
| WO | WO 02/062462 A1 | 8/2002 |

OTHER PUBLICATIONS

International Preliminary Examination Report (6 pgs), International Application No. PCT/EP2003/014039, International Filing Date Dec. 5, 2003.

* cited by examiner

*Primary Examiner* — Jill Warden
*Assistant Examiner* — Shogo Sasaki
(74) *Attorney, Agent, or Firm* — Nixon & Vanderhye

(57) ABSTRACT

Process for providing a flow of particulate matter to a reactor, by intermittently adding the particulate matter and a diluent to a mixing tank, and continuously withdrawing a slurry of particulate matter in diluent from the mixing tank for introduction into the reactor. Prior to each addition of particulate matter and diluent to the mixing tank, the concentration of particulate matter in the diluent already in the mixing tank is measured or calculated, and the amount of particulate matter and diluent subsequently added is measured so as to achieve the same concentration at the end of the addition as that measured or calculated prior to the addition.

12 Claims, 1 Drawing Sheet

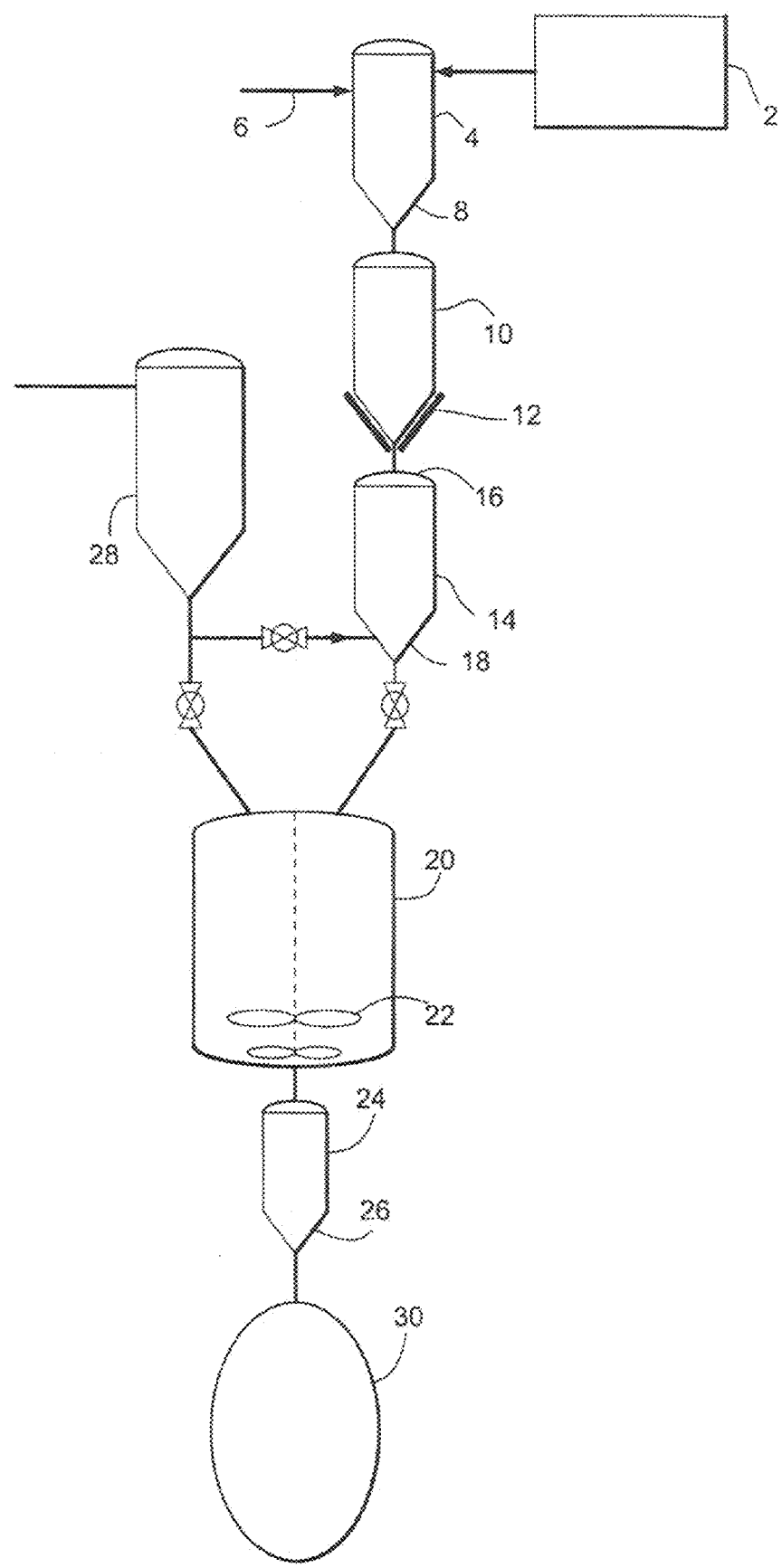

PARTICULATE FLOW CONTROL PROCESS

This application is continuation of application Ser. No. 10/538,844 filed Jun. 13, 2005, now U.S. Pat. No. 7,713,490, which claims priority to 0229133.4 filed Dec. 13, 2002, which is a 371 of PCT/EP03/14039 filed Dec. 5, 2003, the entire contents of each of which are hereby incorporated by reference.

This invention relates to the control of flow of a particulate feed to a reactor; in particular a method of establishing continuously controlled flow of particulate material such as catalyst to a reactor.

In a typical slurry polymerization reaction, monomer, diluent and a particulate catalyst are fed to a reactor where the monomer is polymerized. The diluent does not react but the quantity of diluent supplied to the reactor is typically utilized to control solids concentration in the reactor and also to provide a convenient mechanism for introducing the particulate solid catalyst into the reactor. In typical gas phase reactions too, the particulate catalyst is generally transported to the reactor using an inert gas carrier, however a typically inert diluent may also be used where the quantity of diluent introduced can be kept in balance with the requirements for gas phase composition control. In gas phase reactions the inert diluent introduced is typically introduced to optimise the heat removal from the reaction system.

Catalyst is generally in the solid state, and fragile. In many processes, the quality of the produced product and operability of the process depends on the particle size and particle size distribution of the (generally fragile) catalyst. If the catalyst is damaged during its injection into the process, there can be disadvantageous effects on the process such as increased fines levels, changed molecular weight distribution, lowered bulk densities, etc. Generally the catalyst has to go from a low pressure (atmospheric or near atmospheric state) to a high pressure state to be able to enter the reactor (20-50 barg, but can be a much larger range). It is generally required to do this at a consistent, specific flowrate without damaging the catalyst (i.e. maintaining particle size, not crushing it etc).

In some known systems, a slurry of catalyst in mineral oil is pumped into a reactor. The speed of the pump is varied to adjust the catalyst flow to the reactor. However there are a number of problems with this type of arrangement. Generally the catalyst is crushed to some extent in the pump: as a consequence, a viscous high density liquid (mineral oil) is typically used to minimise this crushing, and the high viscosity of the liquid can reduce the settling velocity of the suspended catalyst. In another known process, a dry catalyst is wetted with diluent at high pressure to form a catalyst "mud", which is fed to the reactor under a pressure differential via a "ball and cup" feeder system of known volume. However, the "ball and cup" can have frequent mechanical problems, problems with consistency of catalyst delivery, and is a batch feed system for a continuous process, which inherently causes small upsets to the reaction process. In some cases this can cause quality and production problems in the reactor. Furthermore, perhaps most significantly the ball and cup feed system does not indicate the true massflow of catalyst to the reactor—it is based on the assumption of volumetric flow, with an assumed fill fraction of the volume being injected into the reactor. This assumption is often incorrect.

It is known to feed a mixture of dry solid particulate catalyst and diluent to a catalyst storage tank for thorough mixing before injection in controlled amounts into a reaction vessel for contact with the monomer reactants. By contrast in U.S. Pat. No. 5,098,667 a process is disclosed whereby a dilute slurry is formed in a mix tank to provide a source of particulate material from which a continuous flow of solid particles into a reactor is established. The dilute slurry is formed from concentrated slurry supplied from a "mud" tank and additional diluent. The flow rate of the dilute slurry from the mix tank into the reactor is continuously adjusted so as to provide a desired flow rate of solid particles contained in the dilute slurry, in response to a computed value of the mass flow rate of the solid catalyst particles contained in the dilute slurry. The computed mass flow rate of catalyst particles is based upon "on line" measurements of density and flow rate of the dilute catalyst slurry stream flowing to the reactor, and on predetermined densities of the solid catalyst particles and the liquid diluent constituting the slurry. The main disadvantage with this arrangement is that the calculations are based on density of the slurry from which an estimation of the concentration of catalyst is made: this is an inaccurate method due to the inherent assumptions required such as variation of liquid density with temperature and pressure.

We have developed a process which avoids many of the above-mentioned problems by providing a system in which catalyst mixing tank is supplied batchwise with catalyst and diluent, but which provides a continuous flow of catalyst slurry to a reactor and which permits accurate evaluations to be made both of the concentration of the catalyst slurry in the mixing tank and that supplied to the reactor.

Accordingly in a first aspect the present invention provides a method of providing a flow of particulate matter to a reactor, comprising intermittently adding said particulate matter and a diluent to a mixing tank, and continuously withdrawing a slurry of particulate matter in diluent from the mixing tank for introduction into the reactor, wherein prior to each addition of particulate matter and diluent to the mixing tank, the concentration of particulate matter in the diluent already in the mixing tank is measured or calculated, and the amount of particulate matter and diluent subsequently added is measured so as to achieve the same concentration at the end of the addition as that measured or calculated prior to the addition.

Preferably the measurement of the amount of particulate matter and diluent added to the mixing tank is carried out before any diluent is added to the particulate matter, which may occur before addition to the mixing tank as discussed below.

Generally the concentration of particulate matter in the diluent is calculated using measurements of the volume or mass of diluent in the mixing tank, and the mass of particulate matter added to the mixing tank.

Although diluent and particulate matter may be added to the mixing tank separately, in one embodiment some or all of the diluent can be used to flush the measured amount of particulate matter into the mixing tank.

Usually the particulate matter is a catalyst, typically for use in a polymerisation reaction.

The advantage of the present invention is that by measuring the amount of diluent added to the mixing tank, it is possible to make a direct calculation of the concentration of slurry in the mixing tank at any time, which enables more accurate measurement and control of the amount of particulate matter delivered to the reactor.

In a preferred embodiment the invention also provides means for measuring the mass flow of particulate matter and diluent out of the mixing tank to the reactor. Diluent volume in the mixing tank is preferably determined by measuring the level of diluent in the tank and then calculating the volume of liquid. In this calculation, the volume of catalyst is usually ignored. It is also possible to determine the diluent volume by use of a flowmeter on the diluent line leading into the mixing tank and subtracting the flow of diluent which leaves the tank.

The invention will be further described by specific reference to the case where the particulate matter is a catalyst, although everything described below applies equally to any particulate matter.

Catalyst mass in the mixing tank may be determined initially by measuring the mass of catalyst which is discharged into the tank, normally from a separate catalyst feed pot.

The initial slurry concentration in the mixing tank is known from the catalyst mass and diluent volume measured as described above. This concentration is updated during the steps of refilling of catalyst and dilution with additional diluent as follows. Following catalyst refill, the new mass of catalyst in the mixing tank is determined by directly measuring that mass discharged into it, and adding that this to the mass of catalyst present in the mixing tank before the refill. With the volume of diluent in the tank known, this new mass is used to update the slurry concentration. A measured amount of diluent is then added until the concentration reduces to its initial level. Once dilution is complete, the new catalyst slurry concentration is recorded to be used in calculations for the next refill. In a preferred embodiment, the mass of catalyst is measured prior to mixing it with any diluent.

It is also possible to measure the actual catalyst massflow discharged to the reactor by measuring the density and mass flow rate out of the mixing tank, for example using a Coriolis flowmeter. By calculating the theoretical density of the diluent at the temperature and pressure of the slurry tank, and comparing this to the measured density of the slurry in the flowmeter, the instantaneous mass flow rate of catalyst can be calculated. Although the invention is particularly useful for slurry polymerisation reactions, it can also be used for gas phase polymerisations, in which case the amount of fresh diluent used is typically much less, although the principles of the invention remain the same.

Where it is necessary for efficiency and/or mass balance requirements to minimize the quantity of fresh diluent used in this process it is possible to use as the diluent make-up comonomer or monomer lean recycled condensibles recovered from either the reaction loop or the degassing system. The principle constraint on such use is the avoidance of any fouling as a result of polymerisation of the catalyst. Such recycled streams have also been found to be suitable to assist the conveyance of the diluted catalyst stream to the reactor after it exits the mixing tank.

BRIEF DESCRIPTION OF THE DRAWING

One embodiment of the invention will now be described. The vessels and apparatus employed in the process are, in sequential order:

Catalyst storage vessel (catalyst carrier): This vessel 2 handles the catalyst as it comes from the catalyst preparation unit. As such, it is thus adapted to the physical state in which the catalyst arrives at the plant before feeding.

Dry catalyst carrier: For catalyst in the dry state, this is a simple vessel 4 designed to an overpressure of a dry inert gas (usually nitrogen 6) to avoid atmospheric contamination of the catalyst. The tank has a cone bottom 8 to facilitate the flow of solid catalyst out of the bottom.

Catalyst day tank: This tank 10 has a cone bottom to allow solid catalyst to flow out the bottom. The tank is usually under dry inert gas overpressure (usually nitrogen) to protect the catalyst from atmospheric contamination. The tank is on load cells 12 so that the contents of the tank can be weighed. The purpose of the tank is to provide gravity feed of the solid catalyst into the feed pot 14, the amount of which can be directly determined by measuring the weight of the day tank before and after discharge.

Catalyst Feed Pot: The catalyst feed pot 14 is a small vessel. Volume can vary significantly but it is typically 5 to 100 liters, more often 20 to 50 liters, and depends greatly on the properties of the catalyst being fed, the production process and production rate required. This vessel has a cone top 16 and bottom 18: the cone bottom 18 facilitates the flow of catalyst out of the tank. The cone top 16 is designed to maximise filling of the solid catalyst.

Catalyst slurry tank: This rank 20 is a vertical cylindrical tank havinq a residence time of approximately 2-5 hours. (This can vary greatly depending on the properties of the catalyst and the properties of the slurry liquid being used). The tank has an agitator 22, which is preferably designed to have a minimum of mechanical impact on the catalyst.

Buffer vessel: This is a small vertical cylindrical tank 24 with a cone bottom 26. The tank has a pressure measurement and level indicator. Its purpose is to mix the slurry from the slurry tank with additional (fresh or recycled) diluent from the diluent vessel 28 before the light slurry is pumped to the reactor 30. It is optionally employed when a catalyst feed pump is used.

Catalyst Feed Pump: This pump is optional; alternatively, an overpressure in the slurry tank can be used to push catalyst into the reactor. The catalyst feed pump is typically a diaphragm pump (2.5 $m^3/h$) with suction inlet on top and discharge on the bottom. Usually the valves have to be spring loaded to ensure that they do not hang open if solid catalyst gets between the valve and the seat.

Essentially the process consists of two systems operating together: a batch catalyst refill and dilution system feeding a slurry tank, and a continuous catalyst slurry flow out of the slurry tank to the reactor (normally through a catalyst pump).

There are several ways to operate the batch refill/dilution system, whereas the operation of the continuous slurry flow to the reactor is more simple.

Catalyst Refill and Diluent Addition in the Catalyst Slurry Tank

This part of the process consists of the following general steps.

In case of dry catalyst: transferring the catalyst from the carrier vessel to the day tank (not required, but usually easier due to geometrical constraints of gravity feeding of the dry catalyst into the charge vessel).

Refilling the catalyst feed pot from the catalyst day tank;
Transferring the catalyst in the catalyst feed pot to the slurry vessel;
Diluting the slurry vessel to the target slurry concentration.
Preparation of the day tank: The catalyst is introduced into the dry catalyst carrier. The catalyst carrier is connected to the catalyst day tank, and the weight of the catalyst day tank recorded (tare) using the load cells. The catalyst is pneumatically transferred to the day tank (day tank is usually above the carrier). Care has to be taken to use low pressure and flowrates during the pneumatic transfer or the catalyst can be damaged. Once the transfer is finished, the catalyst carrier is disconnected and removed to the catalyst preparation area. The weight in the catalyst day tank is recorded; the difference is the weight of catalyst it contains. The day tank is under a light overpressure of dry inert gas (nitrogen at about 4 barg, but the pressure can vary significantly).

When operating with dry catalysts, there are two different modes of refill and dilution of the slurry tank: so-called "dry/dry" and "dry/wet".

Dry/Dry mode: In this mode of operation, catalyst begins in the catalyst day tank under nitrogen at about 4.0 barg. From here the catalyst feed pot is refilled with dry catalyst, the amount of which is weighed using the load cells under the day tank, and pneumatically conveyed to the slurry tank typically using a flush of nitrogen. A measured volume of diluent is then added direct to the slurry tank. The advantage of dry/dry mode is that refill of the catalyst feed pot is generally excellent since the catalyst is dry at all times; and it is in theory the best for valve life. A potential disadvantage is that the catalyst is not properly wetted in the slurry tank and can form into lumps or can be blown out the nitrogen vent of the slurry tank during pneumatic conveying.

Dry/Wet mode: In this mode of operation a weighed amount of dry catalyst is discharged into the catalyst feed pot as in dry/dry mode, but the catalyst is then wetted with a small amount of diluent, which is added slowly, preferably from the bottom of the feed pot. The wetted catalyst is then flushed into the slurry tank using a measured amount of diluent. All of the diluent added to the slurry tank can be used for flushing, or some of the diluent can be added direct to the slurry tank (and the quantity also measured), in which case both lots of diluent are used for the concentration calculation. The advantage of dry/wet mode is that the catalyst is wetted in a slow and controlled manner. Potential disadvantages with this mode of operation are that the catalyst feed pot is not correctly refilled because of liquid diluent which makes the catalyst stick or fluidised on refill.

Slurry Tank Mass Balance and Catalyst Flow Control

In order to maintain consistent catalyst feed conditions to the reactor, a continuous mass balance of catalyst and diluent is calculated in the slurry tank. This mass balance is used to calculate the slurry concentration in the slurry tank (g/l), and this concentration is used to adjust the catalyst flowrate such that a constant catalyst flow to the reactor is maintained, even during dilution of the slurry tank with additional diluent.

There are two aspects to the mass balance: the amount of catalyst and the amount of diluent. Diluent volume is determined by the level of slurry in the slurry tank. The volume of catalyst in the slurry is ignored. As described previously, the method to determine catalyst mass is to check the weight of catalyst which actually enters the catalyst feed pot by measuring weight loss in the catalyst day tank load cells (other weight systems can also be used). The weight loss of the catalyst day tank during catalyst charge pot filling indicates the amount of catalyst which will eventually be injected into the catalyst slurry tank during refill. This makes it possible to achieve a true mass balance system for the catalyst.

In any embodiment which does not use a catalyst day tank, the catalyst carrier can be put on a scale, and the loss of catalyst weight during filling of the catalyst feed pot can be measured in a similar fashion.

Calculation of Slurry Concentration in Slurry Tank

The slurry concentration is updated during refilling/dilution in the following manner. As an example, if a refill is started at 60% level in the slurry tank, the following is calculated.

First, the volume of diluent and mass of catalyst in the vessel before refill is determined. Diluent volume is calculated using the level of slurry in the slurry tank. As previously mentioned, diluent volume can also be determined by totalizing diluent flow during dilution and subtracting the catalyst slurry flow which has left the slurry tank since the last refill. This catalyst slurry tank diluent volume is then used to calculate the mass of catalyst in the slurry vessel using the present slurry concentration. For example, if there are 1.8 $m^3$ of slurry in the vessel before refill, and a slurry concentration of 25 g/l, then the mass of catalyst before refill would be: 1.8 $m^3$*(1000 $l/m^3$)*25 g/l=45000 g of catalyst in the slurry vessel.

Both the starting volume and starting catalyst mass are noted.

Once catalyst refill begins, the mass of catalyst injected into the slurry tank is determined as previously mentioned, and this amount added to the above-calculated mass of catalyst present before the refill. For example, if 47 litres are refilled with a catalyst charge pot fill efficiency of 95% and a catalyst bulk density of 160 $kg/m^3$:

Catalyst refill=47 l*95%*0.160=7144 g of catalyst. This weight of catalyst is verified by the loss in weight of the catalyst day tank during refill.

In this case, the total mass of catalyst in the slurry tank becomes 7144 g injected+45 000 g existing mass=52144 g.

This new mass is then used to continuously update the slurry concentration. Since diluent is just beginning to be refilled, the concentration obviously starts higher than the set point of 25 g/l:

52144 g of catalyst/1800 l diluent=28.96 g/l catalyst slurry concentration.

Dilution of the slurry in the slurry tank continues until the catalyst concentration reaches its set point (or until the tank is full). In this case, if the catalyst concentration set point is 25 g/l, the diluent will continue to refill until the total volume of slurry in the slurry tank is 2085 litres:

52.144/2085 litre=25.00 g/l.

Once refill is complete, the catalyst slurry concentration is saved in a register to be used for calculations for the next refill.

Note in this case, it has been assumed that the refill is relatively fast, and the fact that some of the slurry in the slurry tank is discharged to the reactor during the refilling operation is ignored.

It should also be noted that although in this example catalyst has been added first, followed by dilution, the opposite can also work. It will be seen that so long as the existing slurry concentration is known together with the mass of catalyst in the feed pot (which will all be added to the slurry tank), the amount of diluent to be added is immediately calculable.

Continuous Catalyst Feed from the Catalyst Slurry Tank to the Reactor

This part of the process is characterised by the following, and is the same for all types of catalyst and modes of refill/dilution:

Flow control of the catalyst slurry out of the slurry tank via a control valve
  (optional) addition of catalyst diluent (typically before the optional catalyst pump). This improves the flow properties of the catalyst in the line to the reactor and reduces the chance of catalyst damage in the (optional) catalyst feed pump.
  (optional, necessary if the slurry tank pressure is less than the reactor pressure) Pumping of the diluted catalyst slurry, preferably with a vertically oriented diaphragm pump, preferably with the suction valve on top and the discharge valve on the bottom. During refill of the slurry tank, it has been shown above that the slurry concentration temporarily changes until refill of both catalyst and diluent is complete.

In the case where catalyst is added first, the concentration will briefly rise before falling back to the set level once diluent addition is complete. Because the concentration can be accurately calculated, the flow control of slurry out of the slurry tank to the reactor can be temporarily adjusted so as to maintain a constant mass flow of catalyst to the reactor. Thus in the case where catalyst is added to the slurry tank first, the rise in slurry tank concentration is compensated by a corresponding reduction in flow rate out of the slurry tank such that the mass of catalyst passing to the reactor remains unchanged. The extent of such variation depends on the relative sizing of the various components of the system, however even when relatively large variations of slurry concentration are experienced in the catalyst mixing drum (e.g. slurry concentration increases of up to 30%), the accurate knowledge of the actual slurry concentration provided by the invention allows for satisfactory control of the actual catalyst flowrate to the polymerization reactor.

One advantage of this maintenance of a constant catalyst mass flow rate to the reactor is that the proportion of slurry in the slurry tank which is renewed during each refill can be significant. This proportion depends partly on the working concentration of the slurry in the slurry tank, and also on the maximum possible peak concentration during refilling. These in turn are a function of catalyst properties such as bulk density, particle density, diluent density, agitator interaction with slurry (too high a concentration requires excessively high agitator power which can lead to catalyst damage), and catalyst particle fragility. Another limiting factor is the lowest controllable flow which can reliably pass through the control valve at the outlet of the slurry tank to the reactor. If the peak slurry concentration during refilling is too high, the agitator may have difficulty adequately distributing the catalyst through the slurry.

When all the above factors are taken into account, it is generally found that the catalyst feed pot can contain up to a quarter of the mass of catalyst present in the slurry tank such that a quarter of the slurry volume is replaced in each refill.

Whilst mass flow of catalyst out of the slurry tank to the reactor and hence rate of catalyst addition to the reactor is controlled, the concentration at which the catalyst is added to the reactor can be varied by adding additional diluent before the slurry enters the reactor. This can be done for example to ensure an appropriate flowability for pumping.

An optional buffer vessel can be placed between the slurry tank and the reactor, and can be used in different ways.

Level Control of Buffer Vessel

In this mode of operation, the buffer vessel is run with a specific level (for example 50%) which is controlled by a diluent makeup flow to the vessel. Catalyst slurry enters the buffer tank on flow control (flow of catalyst to the reactor is this flow multiplied by the catalyst slurry concentration in the slurry tank): the pressure in the buffer tank is less than the pressure in the slurry tank. The catalyst pump receives the mixed outlet of the buffer tank, and is run at a particular speed so as to control the concentration of slurry being pumped e.g. to about 1 g/l. In this system, if the pump flow is reduced, the level in the buffer tank increases, which reduces the diluent flow, thus increasing the catalyst concentration being pumped.

Pressure Control of Buffer Vessel

In this system, the buffer vessel is run liquid full. Its pressure is controlled by adjusting the diluent makeup to the buffer vessel. The pressure is controlled to be below the pressure of the slurry tank. Catalyst flow to the buffer tank is via a control valve. The speed of the pump is controlled so as to adjust the concentration of catalyst in the pumped slurry (faster flowrate equates to lower slurry concentration being pumped).

Differential Flow to Buffer Vessel

In this system, the buffer vessel is liquid full and the pump runs at constant speed. The catalyst slurry flow control valve is held open. The flowrate of catalyst is adjusted by adjusting the flow of makeup isobutane to the buffer vessel.

Pressure Differential Systems

It is also possible to eliminate the catalyst pump if the pressure of the reactor is less than the pressure in the slurry tank. In these cases, the flow of catalyst is controlled by the flow control valve directly. Injection of additional diluent after the catalyst flow control valve is possible and preferable. The reactor pressure can be lowered, or the pressure in the slurry tank can be increased by injecting high pressure inert gas in the gas phase of the tank on pressure control. Such pressurized feed systems have the advantage of further minimizing any catalyst fragmentation by avoiding the use of a pump whilst ensuring reliable continuous feed rate control.

The invention claimed is:

1. Process for providing a flow of particulate matter to a reactor, in which a mixing tank is supplied batchwise with particulate matter and diluent and a flow of said particulate matter and said diluent is provided continuously from said mixing tank to said reactor, comprising:
   intermittently adding said particulate matter and said diluent to the mixing tank; whilst continuously withdrawing a slurry of said particulate matter in said diluent from the mixing tank for introduction into the reactor;
   wherein prior to each addition of said particulate matter and said diluent to the mixing tank, the concentration of said particulate matter in said diluent already in the mixing tank is measured or calculated, and the amount of said particulate matter and said diluent subsequently added is measured so as to achieve the same concentration at the end of the addition as that measured or calculated prior to the addition; and
   wherein said particulate matter is a catalyst.

2. Process according to claim 1, wherein measurement of the amount of said particulate matter and said diluent added to the mixing tank is carried out before any of said diluent is added to said particulate matter.

3. Process according to claim 1, wherein said diluent and said particulate matter are added to the mixing tank separately.

4. Process according to claim 1, wherein some or all of said diluent is used to flush the measured amount of said particulate matter into the mixing tank.

5. Process according to claim 1, wherein the concentration of said particulate matter in said diluent in the mixing tank is calculated using measurements of the volume or mass of diluent in the mixing tank, and the mass of said particulate matter added to the mixing tank.

6. Process according to claim 1, wherein at each addition of said particulate matter and said diluent to the mixing tank, said particulate matter is first measured in to a feed pot, which is subsequently emptied into the mixing tank.

7. Process according to claim 6, wherein said particulate matter is discharged before and after each addition into the feed pot from a vessel and the amount measured into the feed pot is determined by weighing the vessel.

8. Process according to claim 1, further comprising the step of measuring the mass flow of said particulate matter and diluent out of the mixing tank to the reactor.

9. Process according to claim 1, wherein the reactor is a polymerization reactor, and mass flow of said catalyst to the reactor is controlled by the process.

10. Process according to claim 9, wherein said polymerization reactor is operating continuously, and mass flow of said catalyst thereto varies by less than 10% during filling of the mixing tank.

11. Process according to claim 1, wherein the catalyst is a polymerisation catalyst.

12. Process according to claim 10, wherein mass flow of said catalyst to a continuous polymerization reactor varies by less than 5% during filling of the mixing tank.

* * * * *